United States Patent [19]
Tsui

[11] Patent Number: 5,345,214
[45] Date of Patent: Sep. 6, 1994

[54] VARIABLE RANGE POSITION INDICATOR

[75] Inventor: Tsz Y. (Barry) Tsui, Kwai Chung, Hong Kong

[73] Assignee: STD Electronic International Ltd., Kwai Chung, Hong Kong

[21] Appl. No.: 77,542

[22] Filed: Jun. 17, 1993

[51] Int. Cl.⁵ .................. H01C 10/16; G06F 3/033
[52] U.S. Cl. .................. 338/128; 340/870.38; 345/157; 345/161
[58] Field of Search .................. 338/128, 196; 340/870.38; 345/157, 161, 162, 163, 168

[56] References Cited

U.S. PATENT DOCUMENTS 3,644,911 2/1972 Wiles et al. .................. 340/870.38
4,977,397 12/1990 Kuo et al. .................. 345/163

Primary Examiner—Marvin M. Lateef
Attorney, Agent, or Firm—Leydig Voit & Mayer

[57] ABSTRACT

A position indicator for producing a variable maximum, variable resistance for supplying a variable amplitude signal to a computer indicating the degree of displacement of a controlled element along an axis includes a variable resistance resistor; a variable displacement element coupled to the variable resistor for varying the resistance of the variable resistor according to displacement of the element along an axis; a first fixed resistance resistor connected to first and second terminals of a transistor, the transistor being connected in series with the variable resistor to form a first series circuit; a second fixed resistance resistor, a potentiometer having a fixed resistance and a variable position contact, and a third fixed resistance resistor connected in series as a second series circuit that is connected in parallel to the first series circuit; and an amplifier having a first inverting input terminal and a second non-inverting input terminal connected to the variable resistor and the variable position contact, respectively, and an output terminal connected to a control terminal of the transistor.

10 Claims, 3 Drawing Sheets

VARIABLE RANGE POSITION INDICATOR

TECHNICAL FIELD

The present invention concerns a variable range position indicator and associated circuitry for supplying a variable signal to a computer indicating the degree of displacement of a controlled element. In specific embodiments of the invention, the position indicator is a joystick, trackball, mouse, or similar signal input device.

BACKGROUND

Many personal computers include input ports for joysticks, trackballs, and mice. Each of these input devices controls a variable signal indicating the position or displacement of some element. The input devices are employed in playing computer games or supplying input information to the computer.

FIG. 1 is a perspective view of a conventional joystick 1 intended for use with IBM and IBM compatible computers. The joystick 1 includes a housing 2 that forms the base of the joystick and a shaft 3 that is gimbaled so that the shaft of the joystick may be displaced by pivoting about two orthogonal axes. Generally, the joystick includes a "home" position for the shaft so that signals are provided that indicate the displacement of the shaft 3 relative to the home position. In many joysticks, a mechanical release permits the shaft to "float" and move in any direction without restraint or returning to a home position.

FIG. 2 is an internal view of the housing 2 schematically indicating the mechanical elements of the joystick 1. Electrical interconnections are not shown. The joystick includes X and Y potentiometers 10 and 11, i.e., resistors with movable contacts. Each potentiometer includes a rotatable shaft for moving the contact along the fixed resistance element between the input and output terminals of the potentiometer. The joystick shaft is mounted on a portion of a gimbaled sphere 12. Displacement of the joystick in the X direction causes pivoting of a U-shaped member 13 that is pivotally supported at its opposite ends. That member 13 is mechanically connected to the X potentiometer 10 so that displacement of the joystick shaft 3 in the X direction causes a rotation of the shaft of the X potentiometer 10 and, thereby, of the position of the variable position contact of the potentiometer 10. Likewise, displacement of the shaft 3 along the Y direction causes pivoting of a second support member 14 that is pivotally mounted on the U-shaped member 13. The support member 14 is mechanically connected to the shaft of the Y potentiometer 11 so that a Y direction displacement of the joystick shaft 3 rotates the shaft of the Y potentiometer 11 and, thereby, changes the position of the variable position contact with the Y potentiometer 11.

FIG. 3 is a schematic circuit diagram illustrating the electrical operation of the positional signal information part of the joystick 1. The potentiometers 10 and 11 are electrically connected as variable resistors. One terminal of each of the potentiometers 10 and 11 is connected to the source voltage $V_{cc}$, typically 5 volts. Output terminals 15 and 16 are connected to the respective variable position contacts 17 and 18 of the potentiometers 10 and 11. The output terminals 15 and 16 are connected to a computer. The computer senses a part of the supply voltage $V_{cc}$ depending upon the position of the contacts 17 and 18. The analog amplitude of those voltage signals are processed within the computer and supplied as X and Y input signals to the computer program to produce a response on the computer screen corresponding to the displacement of the joystick shaft 3. Typically, each of the variable resistors formed from the potentiometers 10 and 11 are connected to respective one-shot multivibrators that are part of an input circuit of the computer. The time constants of the respective multivibrators are determined by the values of the variable resistors, i.e., the X and Y displacements of the joystick 3. The durations of the output signals produced by the multivibrators are determined by the respective time constants. The durations of the output signals are detected and used by the computer to control the motion and position of an image on a cathode ray tube or other display device connected to the computer.

The joystick 1 also generally includes X and Y thumbwheels 19 and 20. These thumbwheels are used to adjust the initial positions of the variable position contacts 17 and 18 of the potentiometers 10 and 11 in order to establish desired zero or home positions for signal representing the respective axes. Generally, the thumbwheels 19 and 20 are mechanically connected to the potentiometers 10 and 11, respectively, and cause rotation of the bodies of the potentiometers (while the shafts are stationary), thereby adjusting the home positions of the respective variable position contacts of the potentiometers 10 and 11.

FIG. 4 is a view of a trackball 20 that has basically the same function as the joystick 1. However, instead of using a shaft 3 that is pivotally displaceable, a rolling ball or a sphere 21 is employed to adjust the positions of sliding contacts of respective potentiometers. Likewise, a mouse uses the same structure as a trackball except that the rolling ball is recessed and on the under side of the housing. In each case, frictional engagement between the rolling element and a movable element of a potentiometer provides a variable resistance and, thereby, a variable part of $V_{cc}$ to a computer input terminal.

The analog joystick and similar position-indicating input devices traditionally employed with IBM and IBM compatible personal computers have numerous difficulties in operation. Frequently, the center or zero position of the joystick is not stable and will shift the controlled image on the computer screen right, left, down, up, toward the upper or lower right hand, or the upper or lower left hand corner of the screen. Sometimes the joystick cannot move the corresponding image on a screen fully downward, fully to the right side, or fully to the lower right hand corner of the screen. There are a variety of explanations for these problems. The analog signals produced by the joystick are supplied to an interface card that includes the game port of the computer. Sometimes the values of some of the electrical components on the interface card are outside of tolerance limits and, therefore, the interface card supplies inaccurate signals to the central processing unit (CPU) of the computer. In addition, the tolerances of the maximum resistance, and taper, i.e., resistance as a function of variable contact position, of the potentiometers used in a joystick may contribute error in joystick operation.

Generally, the potentiometers employed in the conventionally-available joysticks have maximum resistances of 100 to 150 k$\Omega$. In some instances, certain game software requires a higher or a lower resistance than is used in the generally available joysticks. Software designed for different resistance potentiometers providing different amplitude ranges of the analog signals does not produce correct results with the conventionally-available IBM compatible joysticks. Specially constructed joysticks are expensive and increase the effective cost of the games for which they are needed.

The problems with conventional IBM compatible joysticks can be remedied in several ways. Specially designed game port interface cards may be added to a computer in order to improve the accuracy of the response to a joystick. However, this solution is relatively expensive. Game software can be modified to take into account errors, variations, or the limited range of a particular joystick. However, the software may not be successful in accommodating the characteristics of more than one joystick. Moreover, that accommodation may only be effective with a single computer program.

SUMMARY OF THE INVENTION

An object of the invention is to provide a position indicator having a variable maximum potentiometer resistance that can respond to and be used effectively with game software. Such a position indicator, which may be a joystick, trackball, or mouse, also compensates for errors in game port interface cards. With the improved variable range position indicator according to the invention, the effective maximum resistance of the potentiometer can be chosen anywhere within a wide range, for example, varying by a factor of four, for example, between about 60 k$\Omega$ and 240 k$\Omega$, for an IBM compatible personal computer.

A position indicator for producing a variable maximum, variable resistance for supplying a variable signal to a computer indicating the degree of displacement of a controlled element along an axis comprises: a variable resistor having a variable resistance and first and second terminals; a variable displacement displaceable element coupled to the variable resistor for varying the resistance of the variable resistor in response to the degree of displacement of the displaceable element along an axis; a first fixed resistance resistor and a transistor having first, second, and control terminals, the first fixed resistor being connected to the first and second terminals of the transistor, the transistor being connected in series with the variable resistor at the second terminal of the variable resistor and the first terminal of the transistor as a first series circuit; a second fixed resistance resistor, a potentiometer having a fixed resistance and a variable position contact movable along and electrically connected to the fixed resistance of the potentiometer, and a third fixed resistance resistor, the second fixed resistor, potentiometer, and third fixed resistor being connected in series as a second series circuit, the first and second series circuits being electrically connected together (i) at the first terminal of the variable resistor and at the second fixed resistor and (ii) at the second terminal of the transistor and the third fixed resistor, i.e., in parallel, the connection of the third fixed resistor and the second terminal of the transistor being an output terminal of the indicator; and an amplifier having a first inverting input terminal and a second non-inverting input terminal and an output terminal, the first inverting input terminal and the second non-inverting input terminal of the amplifier being connected to the second terminal of the variable resistor and the variable position contact of the potentiometer, respectively, the output terminal of the amplifier being connected to the control terminal of the transistor whereby the maximum resistance at the output terminal of the indicator is controlled by the variable position contact of the potentiometer.

A dual axis position indicator for producing variable maximum, variable resistances for supplying variable amplitude signals to a computer indicating the respective degrees of displacement of a controlled element along each of two axes comprises: a first variable resistor having a variable resistance and first and second terminals; a first fixed resistance resistor and a first transistor having first, second, and control terminals, the first fixed resistor being connected to the first and second terminals of the first transistor, the first transistor being connected in series with the first variable resistor at the second terminal of the first variable resistor and the first terminal of the first transistor as a first series circuit; a second fixed resistance resistor, a first potentiometer having a fixed resistance and a variable position contact movable along and electrically connected to the fixed resistance of the first potentiometer, and a third fixed resistance resistor, the second fixed resistor, the first potentiometer, and the third fixed resistor being connected in series as a second series circuit, the first and second series circuits being electrically connected together (i) at the first terminal of the first variable resistor and at the second fixed resistor and (ii) at the second terminal of the first transistor and the third fixed resistor, i.e., in parallel, the connection of the third fixed resistor and the second terminal of the first transistor being a first output terminal of the indicator; a first amplifier having a first inverting input terminal and second non-inverting input terminal and an output terminal, the first inverting input terminal and second non-inverting input terminal of the first amplifier being connected to the second terminal of the first variable resistor and the variable position contact of the first potentiometer, respectively, the output terminal of the first amplifier being connected to the control terminal of the first transistor whereby the maximum resistance at the first output terminal of the indicator is controlled by the variable position contact of the first potentiometer; a second variable resistor having a variable resistance and first and second terminals; a variable displacement displaceable element coupled to the first and second variable resistors for varying the resistances of the first and second variable resistors in response to the degree of displacement of the displaceable element along first and second axes, respectively; a fourth fixed resistance resistor and a second transistor having first, second, and control terminals, the fourth fixed resistor being connected to the first and second terminals of the second transistor, the second transistor being connected in series with the second variable resistor at the second terminal of the second variable resistor and the first terminal of the second transistor as a third series circuit; a fifth fixed resistance resistor, a second potentiometer having a fixed resistance and a variable position contact movable along and electrically connected to the fixed resistance of the second potentiometer, and a sixth fixed resistance resistor, the fifth fixed resistor, the second potentiometer, and sixth fixed resistor being connected in series as a fourth series circuit, the third and fourth series circuits being electrically connected together (i) at the first terminal of the second variable resistor and at the fifth fixed resistor and (ii) at the second terminal of the second transistor and the sixth fixed resistor, i.e., in parallel, the connection of the sixth fixed resistor and the second terminal of the second transistor being a second output terminal of the indicator; and a second amplifier having a first inverting input terminal and a second non-inverting input terminal and an output terminal, the first inverting input terminal and the second non-inverting input terminal of the second amplifier being connected to the second terminal of the second variable resistor and the variable position contact of the second potentiometer, respectively, the output terminal of the second amplifier being connected to the control terminal of the second transistor whereby the maximum resistance at the second output terminal of the indicator is controlled by the variable position contact of the second potentiometer.

A circuit for producing a variable maximum, variable resistance for supplying variable signals indicating the degree of displacement of a movable contact of a variable resistor comprises: a variable resistor having a variable resistance and first and second terminals; a first fixed resistance resistor and a transistor having first, second, and control terminals, the first fixed resistor being connected to the first and second terminals of the transistor, the transistor being connected in series with the variable resistor at the second terminal of the variable resistor and the first terminal of the transistor as a first series circuit; a second fixed resistance resistor, a potentiometer having a fixed resistance and a variable position contact movable along and electrically connected to the fixed resistance of the potentiometer, and a third fixed resistance resistor, the second fixed resistor, potentiometer, and third fixed resistor being connected in series as a second series circuit, the first and second series circuits being electrically connected together (i) at the first terminal of the first variable resistor and at the second fixed resistor and (ii) at the second terminal of the first transistor and the third fixed resistor, i.e., in parallel, the connection of the third fixed resistor and the second terminal of the first transistor being an output terminal of the circuit; and an amplifier having a first inverting input terminal and a second non-inverting input terminal and an output terminal, the first inverting input terminal and the second non-inverting input terminal of the amplifier being connected to the second terminal of the variable resistor and the variable position contact of the potentiometer, respectively, the output terminal of the amplifier being connected to the control terminal of the transistor whereby the maximum resistance at the output terminal of the circuit is controlled by the variable position contact of the potentiometer.

DETAILED DESCRIPTION OF PREFERRED EMBODIMENT

Figure 5:
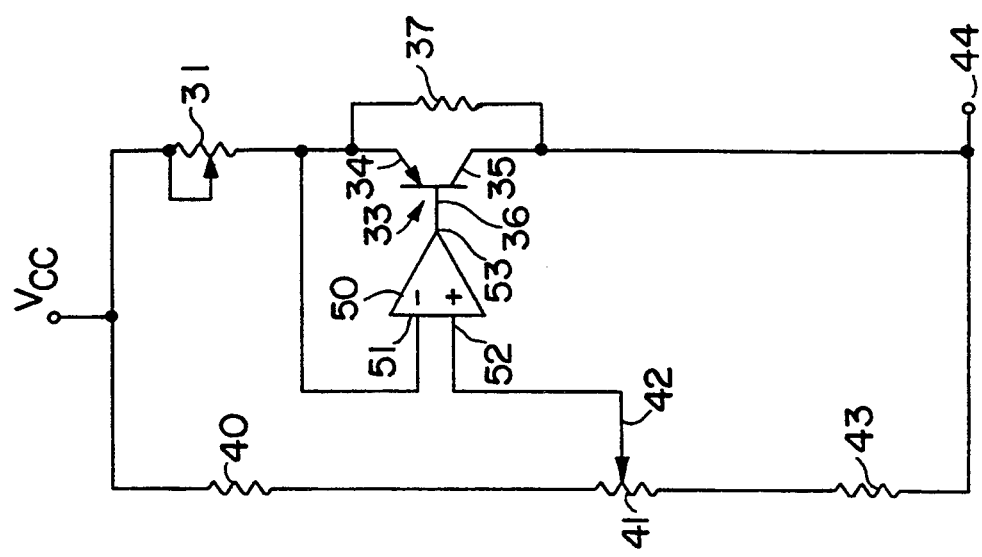
FIG. 5 is a schematic circuit diagram of the electrical portion of a position indicator according to an embodiment of the invention.

A schematic diagram of a circuit providing a variable maximum, variable resistance for supplying variable signals to a computer indicating the degree of displacement of a controlled element is shown in FIG. 5. That circuit includes first and second series circuits that are, in turn, electrically connected in parallel to each other and interconnected to each other through an amplifier.

In the first of the series circuits, a potentiometer is connected as a variable resistor 31. In other words, the variable position contact of the potentiometer is connected to one end of the fixed resistance of the potentiometer to produce a variable resistance resistor 31. The variable resistor 31 includes a first terminal connected to the voltage supply $V_{cc}$, typically 5 volts. The second terminal of the variable resistor 31 is connected to a transistor 33. The transistor 33 includes first and second terminals 34 and 35 and a control terminal 36. The second terminal of the variable resistor 31 is connected to the first terminal 34 of the transistor 33. A fixed value resistor 37 is connected across the first and second terminals 34 and 35 of the transistor 33. Thus, the transistor 33 and the resistor 37 are connected in parallel. The maximum resistance of that parallel-connected combination is the value of the resistance of the resistor 37 and the minimum resistance is essentially zero when the transistor 33, in response to a signal applied to the control terminal 36, reduces the resistance between the first and second terminals 34 and 35 nearly to zero. The parallel-connected transistor 33 and resistor 37 are connected in series with the variable resistor 31 as the first series circuit. In the schematic diagram of FIG. 5, the transistor 33 is a bipolar transistor. However, a field effect transistor can be used in place of the bipolar transistor 33.

The second series circuit includes a fixed value resistor 40, a potentiometer 41 including a variable position contact 42, and a fixed value resistor 43. One end of the resistor 40 is connected to the voltage supply $V_{cc}$ and the second series circuit is connected in parallel with the first series circuit. One of the connections forming the parallel circuit is at the voltage supply $V_{cc}$. The other connection, between the resistor 43, the resistor 37, and the transistor 33, is an output terminal 44 that is connected to the input port of a computer. Most preferably, the resistances of resistors 40 and 43 are substantially smaller than the resistance of the potentiometer 41.

An operational amplifier 50 interconnects the first and second series circuits. The amplifier 50 includes inverting and non-inverting input terminals 51 and 52 and an output terminal 53. The inverting input terminal 51 is connected to the junction of the variable resistor 31, the resistor 37, and the transistor 33. The non-inverting input terminal 52 is connected to the variable position contact 42 of the potentiometer 41. The output terminal 53 of the amplifier 50 is connected to the control terminal 36 of the transistor 33. Not shown are conventional power supply connections for the amplifier 50. Power may be supplied to the amplifier 50 by a battery contained within a joystick or other positional indicator incorporating the circuit of FIG. 5 or from an external source.

The connection from the second terminal of the variable resistor 31 to the inverting input terminal 51 of the amplifier 50 provides a feedback signal path that controls the resistance of the transistor 33 between its terminals 34 and 35. The degree of control provided depends on the magnitude of the signal applied to the input terminal 52 of the amplifier 50. That signal magnitude is determined by the position of the movable contact 42 of the potentiometer 41.

Because of the interconnections in the circuit, certain resistance relationships can be specified for that circuit. The resistance of the variable resistance joystick resistor 31 can be designated $R_v$. The resistance between the second terminal of the variable resistor 31 and the output terminal 44 can be designated $R_{op}$. Both of these resistances are variable. $R_v$ depends upon the position of the sliding contact of the joystick resistor 31. $R_{op}$ depends upon the value of the resistor 37 and the resistance between the first and second terminals of the transistor 33 which is controlled by the position of the movable contact 42 of the potentiometer 41.

In the second series circuit in the circuitry of FIG. 5, the total resistance between the terminal receiving the voltage $V_{cc}$ and the sliding contact 42 may be designated $R_1$. The remaining resistance in the second series circuit may be designated $R_2$. $R_1$ includes the resistance of the fixed resistor 40 and a portion of the resistance of the potentiometer 41. Likewise, the resistance $R_2$ includes the value of the fixed resistor 43 and the residual portion of the resistance of the potentiometer 41. In this circuit, the ratio $R_1:R_2$ is equal to the ratio $R_v:R_{op}$. This relationship means that the maximum effective resistance of the first series circuit of the variable resistance joystick resistor 31 is altered by adjusting the position of the variable position contact 42 of the potentiometer 41 before use of the joystick incorporating the circuitry of FIG. 5.

If that variable position contact 42 is placed exactly in the electrical center of the second series circuit, then $R_1=R_2$. The result is an effective doubling of the maximum effective resistance of the joystick measured at the output terminal 44. That maximum effective resistance can have any value between the product of the maximum resistance of the variable resistor 31 and (i) one plus the result of dividing the resistance of resistor 43 by the sum of the resistances of the potentiometer 41 and the resistor 40, and (ii) one plus the result of dividing the sum of the resistances of the resistance 43 and the potentiometer 41 by the resistance of the resistor 40. For example, if resistors 40 and 43 have resistances of 330 kΩ and 270 kΩ, respectively, and the resistance of the potentiometer 41 is 1MΩ, then the maximum effective resistance as observed at the output terminal 44 of the variable resistor 31 can be varied from about five times the resistance of the maximum value of the resistance of the variable resistor 31 to about 1.2 times the maximum resistance of the variable resistor 31.

The range of the maximum effective resistance that can be achieved with the circuit of FIG. 5 depends upon the relative resistances of the resistors 40 and 43 and the resistance of the potentiometer 41 as well as the maximum resistance of the variable resistor 31. From the values just described and using a conventional LM358N operational amplifier, it is convenient to use a 50 kΩ potentiometer as the resistor 31, a fixed resistor 37 having a resistance of 360 kΩ, and a 9015C bipolar transistor as transistor 33. With those circuit elements, the effective maximum resistance of the indicator can be varied from about 240 kΩ to about 60 kΩ, i.e., resistances that are both above and below the 150 kΩ maximum effective resistance provided in conventional IBM compatible joysticks.

Figure 1:
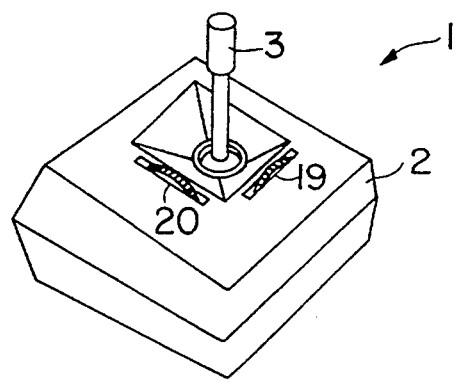
FIG. 1 is a perspective view of a conventional joystick for an IBM compatible computer.
Figure 3:
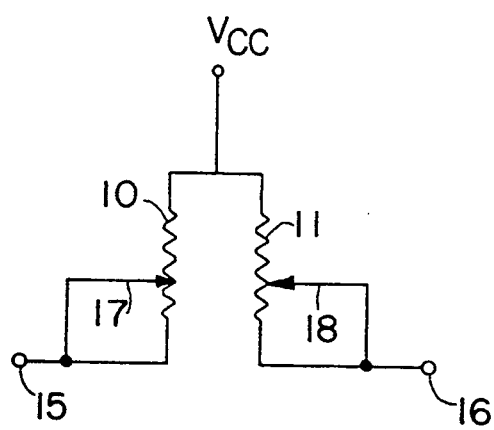
FIG. 3 is a schematic diagram of the electrical circuitry of the joystick of FIG. 1.
Figure 4:
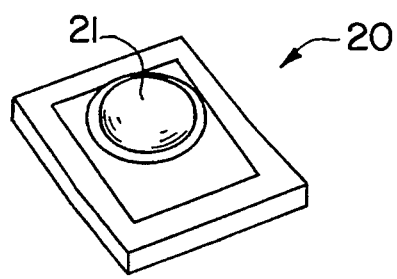
FIG. 4 is a perspective view of a conventional trackball or mouse.
Figure 2:
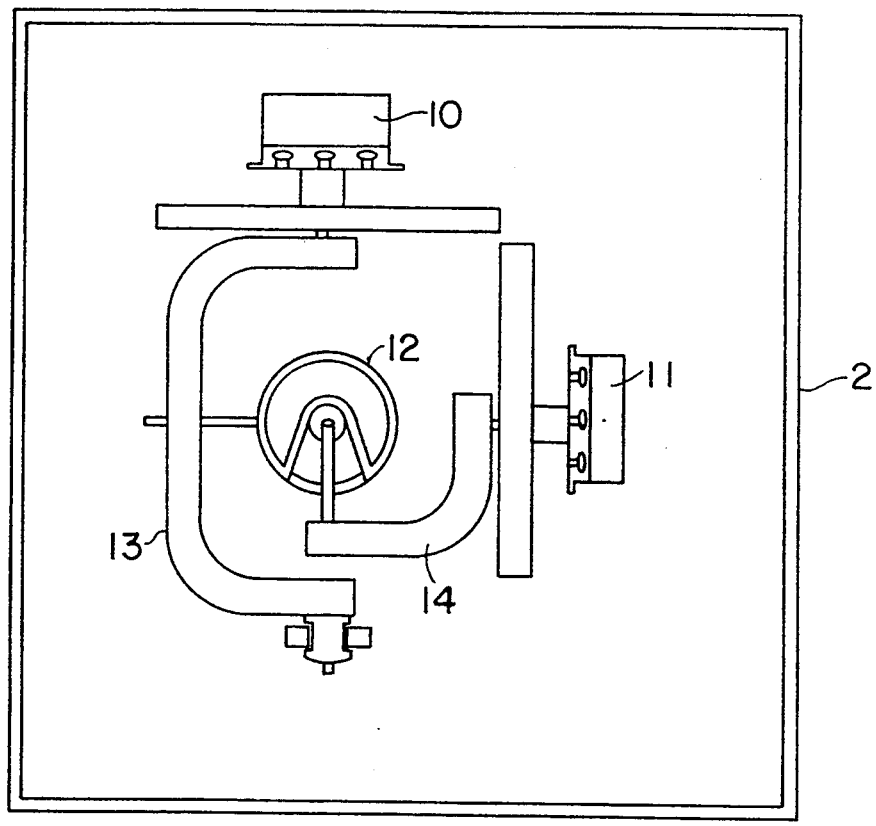
FIG. 2 is an internal view of the joystick of FIG. 1.
Figure 6:
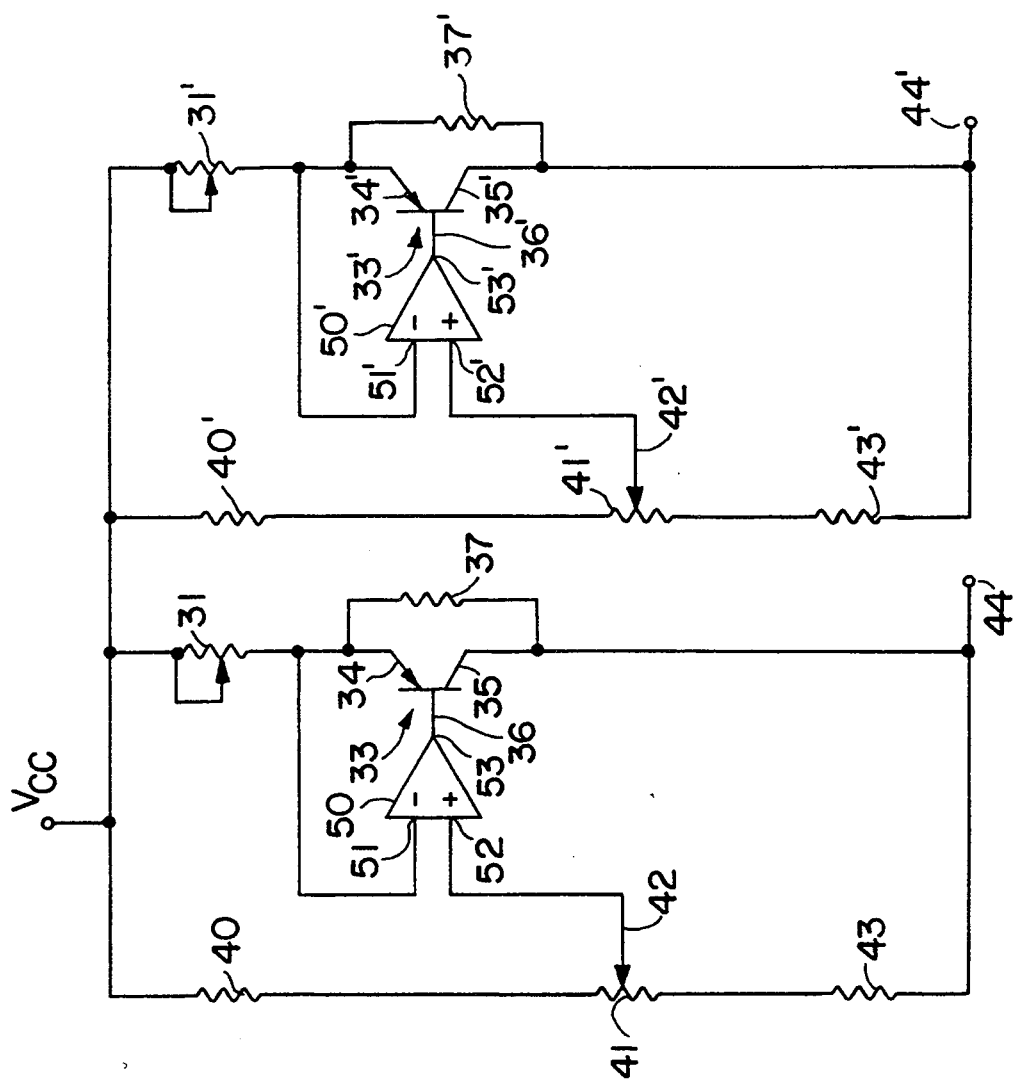
FIG. 6 is a schematic diagram of the electrical portion of a position indicator according to an embodiment of the invention.

In employing the circuitry of FIG. 5 with a joystick of the type illustrated in FIGS. 1 and 2, the X potentiometer 10 of the prior art joystick is replaced by the variable resistor 31. If both X and Y signals are produced as in the conventional joystick, then, as illustrated in FIG. 6, the circuit of FIG. 5 is doubled. One section of that doubled circuit, shown on the left in FIG. 6, is used for the X axis signal production and the other section, shown on the right in FIG. 6 and having corresponding elements numbered with prime symbols, is used to produce the Y axis signal. Whether the circuitry of FIG. 5 or FIG. 6 is employed, before use of the joystick, the potentiometer 41 (and the potentiometer 41', if present) is adjusted to provide the desired effective maximum resistance used in conjunction with particular game software and a particular computer so that the desired range of motion of an indicator on the computer screen is obtained in response to the X axis and Y axis signals. The setting of that potentiometer or potentiometers thereby determines the degree of a "zoom" effect on the screen of the image controlled by the joystick.

Although the foregoing discussion focuses principally on a joystick, the circuitry of FIGS. 5 and 6 can also be employed with other analog position indicating input devices such as trackballs and mice. In those applications, the variable resistor 31 is the resistance, or one of the resistances, that is changed by motion of the sphere or rolling element of a trackball or of a mouse.

Although the invention has been described with respect to position indicating devices, it can be employed in any application where the maximum effective resistance of a variable resistance needs to be adjustable.

The invention has been described with respect to certain preferred embodiments. Various modifications and additions within the spirit of the invention will occur to those of skill in the art from the foregoing description and drawings. Accordingly, the scope of the invention is limited solely by the following claims.

I claim:

1. A position indicator for producing a variable maximum, variable resistance for supplying a variable signal to a computer indicating the degree of displacement of a controlled element along an axis comprising:

a variable resistor having a variable resistance and first and second terminals;

a variable displacement displaceable element coupled to the variable resistor for varying the resistance of the variable resistor in response to the degree of displacement of the displaceable element along an axis;

a first fixed resistance resistor and a transistor having first, second, and control terminals, the first fixed resistor being connected to the first and second terminals of the transistor, the transistor being connected in series with the variable resistor at the second terminal of the variable resistor and the first terminal of the transistor as a first series circuit;

a second fixed resistance resistor, a potentiometer having a fixed resistance and a variable position contact movable along and electrically connected to the fixed resistance of the potentiometer, and a third fixed resistance resistor, the second fixed resistor, potentiometer, and third fixed resistor being connected in series as a second series circuit, the first and second series circuits being electrically connected together (i) at the first terminal of the variable resistor and at the second fixed resistor and (ii) at the second terminal of the transistor and the third fixed resistor, i.e., in parallel, the connection of the third fixed resistor and the second terminal of the transistor being an output terminal of the indicator; and an amplifier having a first inverting input terminal and a second non-inverting input terminal and an output terminal, the first inverting input terminal and the second non-inverting input terminal of the amplifier being connected to the second terminal of the variable resistor and the variable position contact of the potentiometer, respectively, the output terminal of the amplifier being connected to the control terminal of the transistor whereby the maximum resistance at the output terminal of the indicator is controlled by the variable position contact of the potentiometer.

2. The position indicator of claim 1 wherein the variable displacement element includes a joystick mechanically connected to the first variable resistor.

3. The position indicator of claim 1 wherein the variable displacement element includes a rolling sphere mechanically connected to the first variable resistor.

4. The position indicator of claim 1 wherein the transistor is a bipolar transistor.

5. A dual axis position indicator for producing variable maximum, variable resistances for supplying variable signals to a computer indicating the respective degrees of displacement of a controlled element along each of two axes comprising:

a first variable resistor having a variable resistance and first and second terminals;

a first fixed resistance resistor and a first transistor having first, second, and control terminals, the first fixed resistor being connected to the first and second terminals of the first transistor, the first transistor being connected in series with the first variable resistor at the second terminal of the first variable resistor and the first terminal of the first transistor as a first series circuit;

a second fixed resistance resistor, a first potentiometer having a fixed resistance and a variable position contact movable along and electrically connected to the fixed resistance of the first potentiometer, and a third fixed resistance resistor, the second fixed resistor, the first potentiometer, and the third fixed resistor being connected in series as a second series circuit, the first and second series circuits being electrically connected together (i) at the first terminal of the first variable resistor and at the second fixed resistor and (ii) at the second terminal of the first transistor and the third fixed resistor, i.e., in parallel, the connection of the third fixed resistor and the second terminal of the first transistor being a first output terminal of the indicator;

a first amplifier having a first inverting input terminal and second non-inverting input terminal and an output terminal, the first inverting input terminal and second non-inverting input terminal of the first amplifier being connected to the second terminal of the first variable resistor and the variable position contact of the first potentiometer, respectively, the output terminal of the first amplifier being connected to the control terminal of the first transistor whereby the maximum resistance at the first output terminal of the indicator is controlled by the variable position contact of the first potentiometer;

a second variable resistor having a variable resistance and first and second terminals;

a variable displacement displaceable element coupled to the first and second variable resistors for varying the resistances of the first and second variable resistors in response to the degree of displacement of the displaceable element along first and second axes, respectively;

a fourth fixed resistance resistor and a second transistor having first, second, and control terminals, the fourth fixed resistor being connected to the first and second terminals of the second transistor, the second transistor being connected in series with the second variable resistor at the second terminal of the second variable resistor and the first terminal of the second transistor as a third series circuit;

a fifth fixed resistance resistor, a second potentiometer having a fixed resistance and a variable position contact movable along and electrically connected to the fixed resistance of the second potentiometer, and a sixth fixed resistance resistor, the fifth fixed resistor, the second potentiometer, and sixth fixed resistor being connected in series as a fourth series circuit, the third and fourth series circuits being electrically connected together (i) at the first terminal of the second variable resistor and at the fifth fixed resistor and (ii) at the second terminal of the second transistor and the sixth fixed resistor, i.e., in parallel, the connection of the sixth fixed resistor and the second terminal of the second transistor being a second output terminal of the indicator; and a second amplifier having a first inverting input terminal and a second non-inverting input terminal and an output terminal, the first inverting input terminal and the second non-inverting input terminal of the second amplifier being connected to the second terminal of the second variable resistor and the variable position contact of the second potentiometer, respectively, the output terminal of the second amplifier being connected to the control terminal of the second transistor whereby the maximum resistance at the second output terminal of the indicator is controlled by the variable position contact of the second potentiometer.

6. The position indicator of claim 5 wherein the variable displacement element includes a joystick mechanically connected to the first and second variable resistors.

7. The position indicator of claim 5 wherein the variable displacement element includes a rolling sphere mechanically connected to the first and second variable resistors.

8. The position indicator of claim 5 wherein the first and second transistors are bipolar transistors.

9. A circuit for producing a variable maximum, variable resistance for supplying variable signals indicating the degree of displacement of a movable contact of a variable resistor comprising:

a variable resistor having a variable resistance and first and second terminals;

a first fixed resistance resistor and a transistor having first, second, and control terminals, the first fixed resistor being connected to the first and second terminals of the transistor, the transistor being connected in series with the variable resistor at the second terminal of the variable resistor and the first terminal of the transistor as a first series circuit;

a second fixed resistance resistor, a potentiometer having a fixed resistance and a variable position contact movable along and electrically connected to the fixed resistance of the potentiometer, and a third fixed resistance resistor, the second fixed resistor, potentiometer, and third fixed resistor being connected in series as a second series circuit, the first and second series circuits being electrically connected together (i) at the first terminal of the first variable resistor and at the second fixed resistor and (ii) at the second terminal of the first transistor and the third fixed resistor, i.e., in parallel, the connection of the third fixed resistor and the second terminal of the first transistor being an output terminal of the circuit; and an amplifier having a first inverting input terminal and a second non-inverting input terminal and an output terminal, the first inverting input terminal and the second non-inverting input terminal of the amplifier being connected to the second terminal of the variable resistor and the variable position contact of the potentiometer, respectively, the output terminal of the amplifier being connected to the control terminal of the transistor whereby the maximum resistance at the output terminal of the circuit is controlled by the variable position contact of the potentiometer.

10. The position indicator of claim 9 wherein the transistor is a bipolar transistor.

* * * * *